United States Patent
Raghavan et al.

(10) Patent No.: US 11,218,313 B1
(45) Date of Patent: Jan. 4, 2022

(54) DECENTRALIZED VERIFICATION OF DEVICES USING DISTRIBUTED LEDGER TECHNOLOGY

(71) Applicant: Equinix, Inc., Redwood City, CA (US)

(72) Inventors: Srinivasan Raghavan, Singapore (SG); Sreekanth Narayanan, Singapore (SG); Neeraj Kumar Kukreti, Singapore (SG)

(73) Assignee: Equinix, Inc., Redwood City, CA (US)

( * ) Notice: Subject to any disclaimer, the term of this patent is extended or adjusted under 35 U.S.C. 154(b) by 208 days.

(21) Appl. No.: 16/704,914

(22) Filed: Dec. 5, 2019

Related U.S. Application Data

(60) Provisional application No. 62/785,520, filed on Dec. 27, 2018.

(51) Int. Cl.
| | | |
|---|---|---|
| *H04L 9/32* | (2006.01) | |
| *H04L 9/06* | (2006.01) | |
| *H04L 29/06* | (2006.01) | |

(52) U.S. Cl.
CPC ............ *H04L 9/321* (2013.01); *H04L 9/0643* (2013.01); *H04L 63/062* (2013.01); *H04L 63/20* (2013.01); *H04L 2209/38* (2013.01)

(58) Field of Classification Search
CPC ....... H04L 9/321; H04L 9/0643; H04L 63/20; H04L 63/062; H04L 2209/38
See application file for complete search history.

(56) References Cited

U.S. PATENT DOCUMENTS

| | | | |
|---|---|---|---|
| 9,990,504 B1* | 6/2018 | Chapman | G06F 21/645 |
| 2017/0109955 A1* | 4/2017 | Ernest | H04L 9/3257 |
| 2017/0302663 A1* | 10/2017 | Nainar | H04W 4/70 |
| 2019/0026234 A1* | 1/2019 | Harnik | H04L 63/0428 |
| 2019/0141018 A1* | 5/2019 | Hogan | H04L 9/3239 |

(Continued)

OTHER PUBLICATIONS

Christidis et al., "Blockchains and Smart Contracts for the Internet of Things," IEEE Access, vol. 4, May 10, 2016, pp. 2292-2303.

(Continued)

*Primary Examiner* — Cheng-Feng Huang
(74) *Attorney, Agent, or Firm* — Shumaker & Sieffert, P.A.

(57) ABSTRACT

A trusted device is positioned within a private consensus network. The trusted device includes a memory and processing circuitry in communication with the memory. The processing circuitry is configured to obtain, from a private distributed ledger associated with the private consensus network, rules associated with the private consensus network, the private distributed ledger being accessible only to devices positioned within the private consensus network, to identify one or more other trusted devices positioned within the private consensus network, to receive, from an unidentified device positioned within the private consensus network, an identity verification request to identify the unidentified device within the private consensus network, to determine, based on the obtained rules, whether to approve or deny the identity verification request, and to communicate, to the one or more other trusted devices, a vote indicative of the determination of whether to approve or deny the identity verification request.

18 Claims, 8 Drawing Sheets

(56) References Cited

U.S. PATENT DOCUMENTS

2019/0149328 A1* 5/2019 Van Der Velden ... H04L 9/3226
                                                    713/171
2019/0363889 A1* 11/2019 Wang ............... H04L 9/0643
2020/0374700 A1* 11/2020 Smith .............. H04L 9/3247

OTHER PUBLICATIONS

Dorri et al., "Blockchain in Internet of Things: Challenges and Solutions," Computer Science, ArXiv 2016, 2016 (Applicant points out, in accordance with MPEP 609.04(a), that the year of publication, 2016, is sufficiently earlier than the effective U.S. filing date, and so the particular month of publication is not needed.) 13 pp.
Dorri et al., "Towards an Optimized BlockChain for IoT," 2017 IEEE/ACM Second International Conference on Internet-of-Things Design and Implementation (IoTDI), Apr. 18-21, 2017, 6 pp.
"Internet Routing Registry (IRR)," Internet Routing Registry (IRR)—American Registry for Internet Numbers, retrieved from https://www.arin.net/resources/manage/irr/ on Mar. 10, 2020, 3 pp.
"Decentralized Identifiers (DIDs) v1.0, Core data model and Syntaxes," W3C Working Draft 27, Nov. 27, 2019, 52 pp.

* cited by examiner

```
DIDDocument identificationProtocol(deviceA, deviceB) {
    verifyUsingSmartOracle(deviceA.getDeviceInfo);
    verifyUsingSmartOracle(deviceB.getDeviceInfo);
    checkAuthSignature(deviceASig,deviceAPk);
    checkAuthSignature(deviceBSig,deviceBPk);
    generateDID(deviceAPk,deviceBpk,deviceASig,deviceBSig)
    ...;
    signDIDWithSmartContractPk();
    return DIDDocument;
}
```

```
{
  "context": "c1ledger",
  "id": "did:example:123456789abcdefghi",
  "publicKey": [
    {
      "id": "did:example:123456789abcdefghi#device-1",
      "type": "RsaVerificationKey2018",
      "publicKeyPem": "-----BEGIN PUBLIC KEY...END PUBLIC KEY-----\r\n"
    },
    {
      "id": "did:example:123456789abcdefghi#device-2",
      "type": "RsaVerificationKey2018",
      "publicKeyPem": "-----BEGIN PUBLIC KEY...END PUBLIC KEY-----\r\n"
    }
  ],
  "signatures": [
    {
      "created": "2016-02-08T16:02:20Z",
      "creator": "did:example:8uGhQMGzWzR8vw5PJ0WH1ja#device-1",
      "signatureValue": "QNB13Y7Q9...1txjn4w=="
    },
    {
      "created": "2016-02-08T16:02:20Z",
      "creator": "did:example:8uGhQMGzWzR8vw5PJ0WH1ja#device-2",
      "signatureValue": "QNB13Y7Q9...1txjn4w=="
    },
    {
      "created": "2016-02-08T16:02:20Z",
      "creator": "C1SmartContract1",
      "signatureValue": "QNB13Y7Q9...1txjn4w=="
    }
  ]
}
```

FIG. 3B

DECENTRALIZED VERIFICATION OF DEVICES USING DISTRIBUTED LEDGER TECHNOLOGY

CROSS REFERENCE

This application claims the benefit of U.S. Provisional Patent Application No. 62/785,520 filed on 27 Dec. 2018, the entire content of which is hereby incorporated by reference herein in its entirety.

TECHNICAL FIELD

This disclosure relates to computer networks, and in various examples, to consensus networks implemented using distributed ledger technology.

BACKGROUND

A distributed ledger is a data structure that may be shared and synchronized across a network spanning multiple sites, institutions, and/or geographies. Changes or additions made to the ledger are reflected and copied to many (if not all) computing devices (or nodes) on the network. Often, a distributed ledger is implemented as a consensus network, where nodes on the network implement one or more consensus algorithms intended to achieve reliability or agreement among nodes on the network, even where the network might include multiple unreliable or untrustworthy nodes.

Distributed ledgers can be limited in scope to a single entity (e.g., a "private" context ledger), or may bridge different entities (as in the case of "consortium" context ledgers). A blockchain (e.g., the technology underlying various cryptocurrencies, such as Ethereum and Bitcoin) can be considered a distributed ledger that is managed by distributed computers on a peer-to-peer (P2P) network. Blockchain technology has also permeated the management of other types of computer networks, including local area and wide area networks (LANs and WANs).

Each peer (node) on the network maintains a copy of the ledger, and also uses additional measures to help maintain a consensus (which may, in various examples, represent a predetermined quorum) among a number of the nodes on the network. A smart contract is a computer program typically implemented on a consensus network as part of a blockchain or distributed ledger. Smart contracts may be used on a consensus network to facilitate, verify, and/or enforce the negotiation and/or performance of an agreement, contract, or other set of rules.

SUMMARY

This disclosure describes systems and techniques that use smart contracts to dynamically set device identification constraints (also referred to herein as "rules of the game") within a distributed ledger. In some examples, the techniques of this disclosure enable "edge" devices of private entities to utilize separate (or "dual") identities with respect to a consortium ledger and private context ledger of the respective private entity. By way of such dual, compartmentalized identities, the techniques of this disclosure enable edge devices to maintain anonymity where anonymity is a priority, while readily providing identification where identity is a priority. That is, an edge device may bootstrap to both the consortium ledger and the respective private context ledger (e.g., by using .dat files that provide relevant information from the consortium ledger and the respective private context ledger, respectively) of its private network using different identities, thereby maintaining a demarcation between the different identification information associated with being designated as a trusted device in each network environment. In this way, the techniques of this disclosure leverage the separation of consortium ledgers from private context ledgers to serve trusted devices, whether the devices have trusted status with respect to one or both of the ledgers.

In one example, this disclosure describes a method that includes obtaining, by a trusted device positioned within a private consensus network, from a private distributed ledger associated with the private consensus network, rules associated with the private consensus network, the private distributed ledger being accessible only to devices positioned within the private consensus network. The method further includes identifying, by the trusted device, one or more other trusted devices positioned within the private consensus network, and receiving, by the trusted device, from an unidentified device positioned within the private consensus network, an identity verification request to identify the unidentified device within the private consensus network. The method further includes determining, by the trusted device based on the rules obtained from the private distributed ledger, whether to approve or deny the identity verification request, and communicating, by the trusted device, to the one or more other trusted devices, a vote indicative of the determination of whether to approve or deny the identity verification request.

In another example, this disclosure describes a trusted device positioned within a private consensus network. The trusted device includes a memory and processing circuitry in communication with the memory. The processing circuitry is configured to obtain, from a private distributed ledger associated with the private consensus network, rules associated with the private consensus network, the private distributed ledger being accessible only to devices positioned within the private consensus network, to identify one or more other trusted devices positioned within the private consensus network, and to receive, from an unidentified device positioned within the private consensus network, an identity verification request to identify the unidentified device within the private consensus network. The processing circuitry is further configured to determine, based on the rules obtained from the private distributed ledger, whether to approve or deny the identity verification request, and to communicate, to the one or more other trusted devices, a vote indicative of the determination of whether to approve or deny the identity verification request.

In another example, this disclosure is directed to a non-transitory computer-readable storage medium. The non-transitory computer-readable storage medium is encoded with instructions that, when executed, cause one or more processors to obtain, from a private distributed ledger associated with the private consensus network, rules associated with the private consensus network, the private distributed ledger being accessible only to devices positioned within the private consensus network, to identify one or more other trusted devices positioned within the private consensus network, and to receive, from an unidentified device positioned within the private consensus network, an identity verification request to identify the unidentified device within the private consensus network. The instructions, when executed, cause the one or more processors to determine, based on the rules obtained from the private distributed ledger, whether to approve or deny the identity verification request, and to communicate, to the one or more trusted devices, a vote indicative of the determination of whether to approve or deny the identity verification request.

In another example, this disclosure is directed to an apparatus. The apparatus includes means for obtaining, from a private distributed ledger associated with the private consensus network, rules associated with the private consensus network, the private distributed ledger being accessible only to devices positioned within the private consensus network. The apparatus further includes means for identifying one or more other trusted devices positioned within the private consensus network, and means for receiving, from an unidentified device positioned within the private consensus network, an identity verification request to identify the unidentified device within the private consensus network. The apparatus further includes means for determining, based on the rules obtained from the private distributed ledger, whether to approve or deny the identity verification request, and means for communicating, to the one or more other trusted devices, a vote indicative of the determination of whether to approve or deny the identity verification request.

The systems and techniques of this disclosure may provide one or more advantages in the form of technical improvements over existing distributed ledger technology. By enabling edge devices of a private network to maintain separate non-overlapping identities with respect to the consortium ledger and the applicable private context ledger, the systems of this disclosure maintain the anonymity of the edge device with respect to a ledger with which the edge device is not currently communicating, while leveraging streamlined identification based on past bootstrapping to a ledger with which the edge device is currently communicating. Moreover, the systems of this disclosure provide scalability to accommodate the (potentially rapid) addition of numerous devices within a private network. The systems of this disclosure provide technical improvements in a variety of use case scenarios, such as private networks that support an internet of things (IoT) friendly environment.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but rather, are intended to be illustrative of non-limiting examples and implementations consistent with the techniques described herein.

FIGS. 3A and 3B are illustrations of example code listings that represent device identity verification operations.

DETAILED DESCRIPTION

Figure 1:
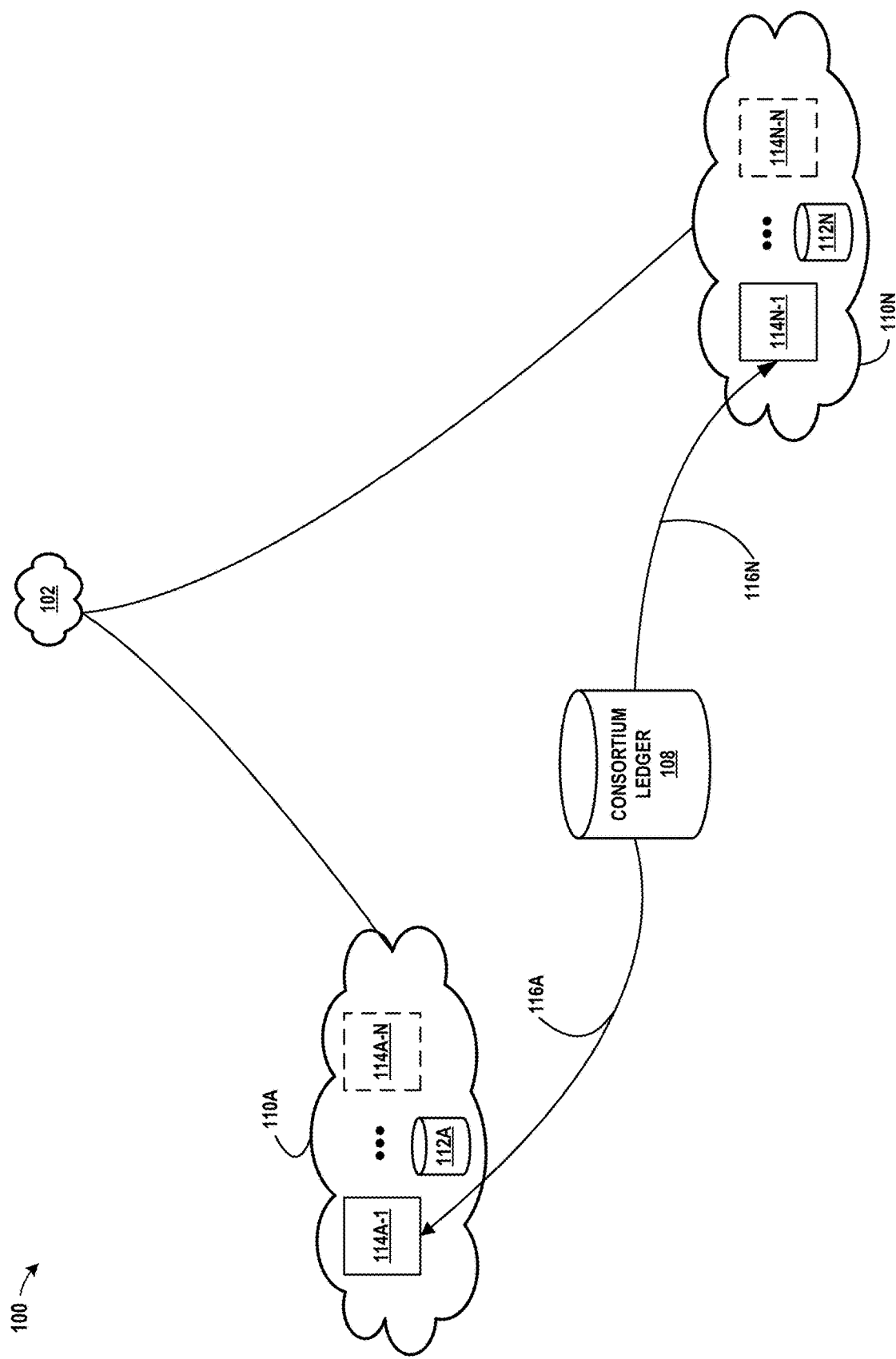
FIG. 1 is a conceptual diagram illustrating a system in which device identities are verified in a decentralized manner, in accordance with one or more aspects of the present disclosure.

With the decreasing costs of chips and other computing hardware, the number of devices in connected environments is steadily on the increase. Moreover, the integration of chips and communication interface hardware has created an ever-broadening choice of so called "smart" devices, giving rise to the "Internet of Things" or "IoT." With the numerous benefits of the IoT also come various potential challenges. For instance, various security concerns and challenges arise from the rapid, and potentially exponential, increase in smart devices joining the IoT.

One such security concern is associated with managing device identities, as the devices join a network, such as a private enterprise network. The deployment of IoT devices also incorporates different contexts. For instance, smart devices may include sensors and communication hardware that send data back to a parent cloud, and/or devices that communicate with each other (in a peer-to-peer manner) within a physical/logical boundary. Some smart devices may be connected across different clouds or be publicly visible, thereby offering one or more services in a cross-cloud capacity.

According to most IoT architectures, smart devices communicate data back to the cloud for all IoT-related functionalities, and any intercommunication between devices within a private entity is entirely routed via the cloud. That is, direct device-to-device communication tends to be limited by identity-verification issues and other security concerns. According to currently available technology, the management of the device identity is implemented in forms of device registries, or with the use of public key infrastructure (PKI). Both device registry-based identity management as well as PKI are centralized in nature.

The scaling of centralized identity management mechanisms, such as PKI, to accommodate the increasing number and varying capacities of devices presents challenges with respect to managing the lifecycle of PKI certificates. To illustrate, the devices in a single IoT environment can range from a small sensor to a computing-resource intense edge device. Because not all devices are positioned in data centers behind firewalls, but rather, exposed to the open network, the devices become vulnerable to a variety of security threats, such as malicious attacks in the form of identity forging to obtain certificate authority (CA) signatures on PKI certificates.

This disclosure describes systems and techniques that provide scalable solutions for device identity management in connected environments. In some aspects, this disclosure is directed to a decentralized context-based device identity management system. According to system configurations described herein, a device's identity in a given network is established and tied to a contextual distributed ledger. More specifically, the device identity is established by a quorum of peer devices within the same consensus network (e.g., "in the same context"), instead of being established by a central authority. The unit of identity for each device is an instance of a decentralized identifier ("DID"). According to aspects of this disclosure, DIDs formed between devices of a single context are fully under the control of the preapproved ("trusted") devices in the same context, and are independent from any centralized registry, identity provider, or certificate authority. Similarly, revocation of network-acceptance from any devices (e.g., one or more devices that have "gone rogue") is implemented locally within a private network, and is not dependent on a centralized registry or revocation list, according to the techniques of this disclosure.

In this way, the dual identity provided systems of this disclosure maintain the anonymity of devices in scenarios where anonymity is a priority, while providing identification information in scenarios in which identity is a priority. Moreover, the systems of this disclosure are scalable to accommodate the (potentially rapid) addition of numerous devices within a private network. While the system configurations of this disclosure provide technical improvements in a variety of use case scenarios, internet of things (IoT) environments are discussed throughout this disclosure. While the technical improvements provided by this disclosure are not limited to IoT environments, IoT environments represent one illustrative example in which the system configurations of this disclosure may be particularly beneficial.

FIG. 1 is a conceptual diagram illustrating a system in which device identities are verified in a decentralized manner, in accordance with one or more aspects of the present disclosure. In the example of FIG. 1, system 100 includes multiple consensus networks, including private consensus network 110A through private consensus network 110N (collectively "private consensus networks 110"). Private consensus networks 110 are communicatively connected via network 102. Network 102 may be part of a public network, such as the Internet. Each of private consensus networks 110 may be owned and/or administered and/or operated by a private entity, such as a business enterprise, government agency, educational institution, residents of a dwelling, etc.

In the example of FIG. 1, each of private consensus networks 110 includes a plurality of nodes. For instance, private consensus network 110A includes nodes 114A-1 through 114A-N (collectively "nodes 114A"), which may represent any number of nodes. Similarly, private consensus network 110N includes nodes 114N-1 through node 114N-N (collectively "nodes 114N"), which, again, may represent any number of nodes. Each of nodes 114A and 114N may include, be, or be part of, a variety of devices, such as devices of varying complexity and functionality that are connectable in an IoT environment. Examples of such devices include personal computers (e.g., desktop, laptop, netbook computers), handheld devices (e.g., tablet computers, smartphones), wearables (smartwatches, smart glasses, virtual reality headsets, augmented reality headsets), smart home devices (e.g., smart thermostats and particulate matter detectors, cameras, motion sensors), sensors (e.g., RFID readers), and so on.

Each of private consensus networks 110 includes one or more private contextual ledgers. In the example shown, private consensus network 110A includes a blockchain or private distributed ledger 112A, which may be implemented as a data store included in multiple (or all) nodes 114A within private consensus network 110A. Private consensus networks 110 (that is, the remainder of the private consensus networks through private consensus network 110N) may be implemented in a similar manner, so that each of private consensus networks 110 includes one or more private distributed ledgers 112 (e.g., consensus network 110N includes distributed ledger 112N). In general, each node within a respective private consensus network 110 (or a significant fraction of the nodes) includes a copy of the private distributed ledgers maintained by the respective private consensus network 110.

Each of private consensus networks 110 includes a network of computing devices (represented by the respective sets of nodes 114) that implement one or more private distributed ledgers 112. Again, each of nodes 114 included within each of consensus networks 110 represent any computing device capable of adhering to a consensus protocol and/or performing operations corresponding to various device identification-related or network-compliance-related rules set forth in the respective private distributed ledger 112. One or more of private consensus networks 110 represent private IoT networks, such as enterprise networks, connected homes, educational institutions, etc. In some instances, one or more of private consensus networks 110 may also represent an Ethereum network of Ethereum virtual machines (EVMs), also known as an Ethereum blockchain platform, executing on computing hardware modalities.

Each of private distributed ledgers 112 (i.e., included within each of private consensus networks 110) represents a shared database or data store. The "blockchain" structure of private distributed ledgers 112 is based on each of private distributed ledgers 112 including a plurality of blocks, where each block (other than the root block) references at least one block created at an earlier time. Each block bundles one or more transactions registered within private distributed ledgers 112, and each block is secured cryptographically. Each respective private consensus network 110 may receive transactions from the respective nodes 114 internal to the respective private consensus network 110, and/or from computing devices external to the respective private consensus network 110 that invoke functionalities of the respective private distributed ledger 112. For instance, the received transaction(s) may modify a given distributed ledger 112 stored within a consensus network. Each of private consensus networks 110 uses the respective private distributed ledger 112 stored within, for IoT device verification.

Moreover, each block of each of private distributed ledgers 112 typically contains a hash pointer as a link to a previous block, along with a timestamp, and transaction data for the recorded transaction(s). By design, private distributed ledgers 112 are inherently resistant to modification of previously stored transaction data. Functionally, each of private distributed ledgers 112 may be distributed across multiple identified (e.g., "trusted") nodes of the nodes 114 of the respective private consensus network 110, where the trusted nodes 114 are capable of recording transactions between parties efficiently and in a verifiable and permanent way. While each of private consensus networks 110 is illustrated in FIG. 1 as including exactly one distributed ledger 112, in various examples, one or more of private consensus networks may include multiple private distributed ledgers, such as different private distributed ledgers for different purposes, consistent with the techniques described herein.

Each of private consensus networks 110 includes a peer-to-peer (P2P) network of the respective nodes 114, such that each P2P network manages the respective private distributed ledger 112 by collectively adhering to a protocol for validating new blocks. Once recorded, the data in any given block of any of private distributed ledgers 112 cannot be altered retroactively without the alteration of all subsequent blocks and a quorum consisting of at least some (e.g., typically a majority or plurality) of nodes 114 of the particular private consensus network 110. For instance, with reference to private consensus network 110A, the data in a block within private distributed ledger 112A cannot be altered retroactively without also altering all subsequent blocks and without agreement of a predetermined quorum of the trusted subset of nodes 114A (where "trusted" indicates that each such node has been identified by a quorum of peer nodes within private consensus network 110A).

Device identification n represents one example of a transaction that each of private consensus networks 110 may manage using the respective private distributed ledger 112. In the example of FIG. 1, nodes 114A-N and 114N-N are illustrated using dashed-line borders, to indicate that nodes 114A-N and 114N-N are pending identification with respect to private consensus networks 110A and 110N, respectively. For instance, each of nodes 114A-N and 114N-N may send an identification request to one or more other nodes positioned in private consensus network 110A and 110N respectively, in accordance with the P2P nature of private consensus networks 110. That is, nodes 114A-N and 114N-N represent, in one use case scenario, IoT devices that are attempting to gain access to private consensus networks 110A and 110N respectively, by acquiring a quorum of peer device approvals.

Each of nodes 114 may also implement one or more "smart contracts" with respect to the respective private distributed ledger 112. For instance, each of nodes 114 may run an executable script or program for performing a transaction for a party or between parties, to modify the current state of the respective private distributed ledger 112. According to one particular example in which private consensus network 110 represents an IoT network, node 114A-1 may implement such smart contracts by running one or more autonomous scripts or one or more stateful decentralized applications that are stored in private distributed ledger 112A for later execution by nodes 114A. In some examples, one or more blocks of private distributed ledger 112A may include smart contract units/modules that represent dedicated hardware components configured to form the smart contracts initiated by the autonomous or automated scripts run by nodes 114A.

Each trusted node of nodes 114A within private consensus network 110A mitigates memory footprint issues by leveraging private distributed ledger 112A. For instance, each of nodes 114A that has been identified with respect to private consensus network 110A, once bootstrapped to private distributed ledger 110A, accesses up-to-date smart contract(s) available from private distributed ledger 110A at each instance of a device that has not yet been identity-verified and is requesting identity verification. Each of nodes 114A may bootstrap to private distributed ledger 110A by running a .dat file that provides relevant data from private distributed ledger 110A. For instance, the trusted nodes of nodes 114A may, at the time of determining whether to cast a 'yes' or 'no' vote with respect to an identity verification request, access the data, script, and/or code implementing a smart contract from private distributed ledger 112A.

An example of a type of smart contract that private distributed ledgers 112 assist in implementing is related to device identification. For instance, node 114A-1, which represents an identified (e.g., trusted) node of private consensus network 110A, may bootstrap to private consensus network 110A, and at the time of bootstrapping, access a smart contract that governs the identification of new devices via P2P validation. Node 114A-1 may use the accessed smart contract to determine whether to cast a 'yes' vote or a 'no' vote when evaluating an identity verification request from node 114N-N. In the example illustrated in FIG. 1, node 114A-1 is one of the IoT devices that is eligible to form a quorum, with respect to approving the P2P identity verification request of node 114A-N.

As shown in FIG. 1, system 100 also includes consortium ledger 108. Consortium ledger 108 implements a distributed ledger or blockchain structure, in a manner similar to that described above with respect to private distributed ledgers 112. For the sake of brevity, the blockchain structure of consortium ledger 108 is not described separately herein, in view of the similarities to the blockchain structure underlying private distributed ledgers 112 as described above. Consortium ledger 108 is a distributed ledger that is accessible to devices of two or more of private consensus networks 110.

A select few of nodes 114 from each of private consensus networks 110 may have communicative access to consortium ledger 108. In the particular example of FIG. 1, node 114A-1 is the only node from private consensus network 110A that has communicative access to consortium ledger 108, and node 114N-1 is the only node from private consensus network 110N that has communicative access to consortium ledger 108. In this example, nodes 114A-1 and 114N-1 may copy relevant smart contract information from consortium leger 108, and disseminate the copied smart contract information to trusted nodes of their respective private consensus networks 110.

Consortium ledger 108 may store and provide smart contract information pertaining to identity verification with respect to consortium ledger 108. For instance, consortium ledger 108 may include identification rules with respect to the identity-verification of currently un-identified edge nodes of one or more of private consensus networks 110. In accordance with aspects of this disclosure, node 114A-1 may obtain, from consortium ledger 108, device identification constraints (illustrated as rules 116A, and also referred to herein as "rules of the game") that govern requirements specific to the public network governed by consortium ledger 108, while maintaining separate a identity with respect to private consensus network 110A. For instance, node 114A-1 may obtain rules 116A to determine whether to cast a 'yes' or 'no' vote with respect to approving or denying a pending identity verification request from another edge node with respect to the public network. Similarly, node 114N-1 may obtain rules 116N to determine whether to cast a 'yes' or 'no' vote with respect to approving or denying the pending identity verification request from other edge nodes (not shown in FIG. 1) with respect to the public network governed by consortium ledger 108. In various examples, rules 116A and rules 116N may be identical, thereby uniformly governing the requirements for edge nodes to be identity-verified onto the public network governed by consortium ledger 108.

By leveraging consortium ledger 108 as a resource to which to store and from which to retrieve information, the techniques and system configurations of this disclosure enable nodes 114 to perform P2P identity verification approval/denial using rules 116, which are backed up outside of the respective private distributed ledgers 110. Moreover, because only select nodes (nodes 114A-1 and 114N-1 in this case) have access to consortium ledger 108, the remaining nodes 114 are shielded from public network exposure. Again, while the remaining trusted nodes 114 other than nodes 114A-1 and 114N-1 do not directly obtain rules 116 from consortium ledger 108, the remaining trusted nodes 114 still cast votes with respect to private network identity verification, by using respective private distributed ledgers 112. In this way, the techniques of this disclosure leverage a public network (via consortium ledger 108 in this case) while maintaining anonymity of devices for which anonymity is a priority, while exposing only those devices (e.g., "edge" devices) for which anonymity is less of a priority.

Further, by enabling a single edge device (or at least a limited number of edge devices) to obtain the respective rules 116, the techniques of this disclosure mitigate complexity, reduce redundant communications, alleviate bandwidth consumption, and potentially conserve energy. For instance, the techniques of this disclosure reduce or potentially eliminate the need for nodes 114 of a private consensus 110 to individually access a private network cloud hub to request identification, and instead, rely on P2P communications that utilize a quorum approval scheme. Moreover, the edge nodes 114 similarly perform quorum-based P2P identity verification determinations using consortium ledger 108 for use in determining whether to approve or deny identification requests from currently unverified devices, thereby reducing or eliminating the need to implement cross-network application programming interface (API) integration. Cross-network API integration involves synchronization across several private clouds, some of which may run on different infrastructures (e.g., Azure®, Amazon Web Services®, etc.). Cross-network API integration is aimed at seamless operation across the networks, and therefore, represents a process that introduces complexity and added resource usage. These reductions in operations according to this disclosure mitigate complexity, communication frequency, bandwidth consumption, and electrical power consumption.

For ease of illustration, a limited number of private consensus networks 110, private distributed ledgers 112, and nodes 114 are shown within FIG. 1 and/or in other illustrations referenced herein. However, the techniques and systems of this present disclosure may be performed with many more of such systems, components, devices, modules, and/or other items, and collective references to such systems, components, devices, modules, and/or other items may represent any number of such systems, components, devices, modules, and/or other items.

In some examples, the private distributed ledger-based decentralized P2P device identification techniques of this disclosure may be implemented in a cloud-based services exchange, also referred to as a cloud exchange fabric, or "cloud exchange." A cloud exchange may be configured and managed to facilitate virtual connections for cloud services delivery from multiple cloud service providers to one or more cloud customers. The cloud exchange may enable cloud customers to bypass the public Internet to directly connect to cloud services providers to improve performance, reduce costs, increase the security and privacy of the connections, and leverage cloud computing for additional applications. In this way, enterprises, network carriers, and SaaS customers, for instance, can integrate cloud services with their internal applications as if such services are part of or otherwise directly coupled to their own data center network. Examples of cloud-based services exchanges are described in U.S. Pat. No. 9,948,552, issued 17 Apr. 2018 and titled "CLOUD-BASED SERVICES EXCHANGE" as well as in U.S. Pat. No. 9,886,267, issued 6 Feb. 2018 and titled "INTERCONNECTION PLATFORM FOR REAL-TIME CONFIGURATION AND MANAGEMENT OF A CLOUD-BASED SERVICES EXCHANGE" the entire contents of each of which are incorporated herein by reference.

Figure 2:
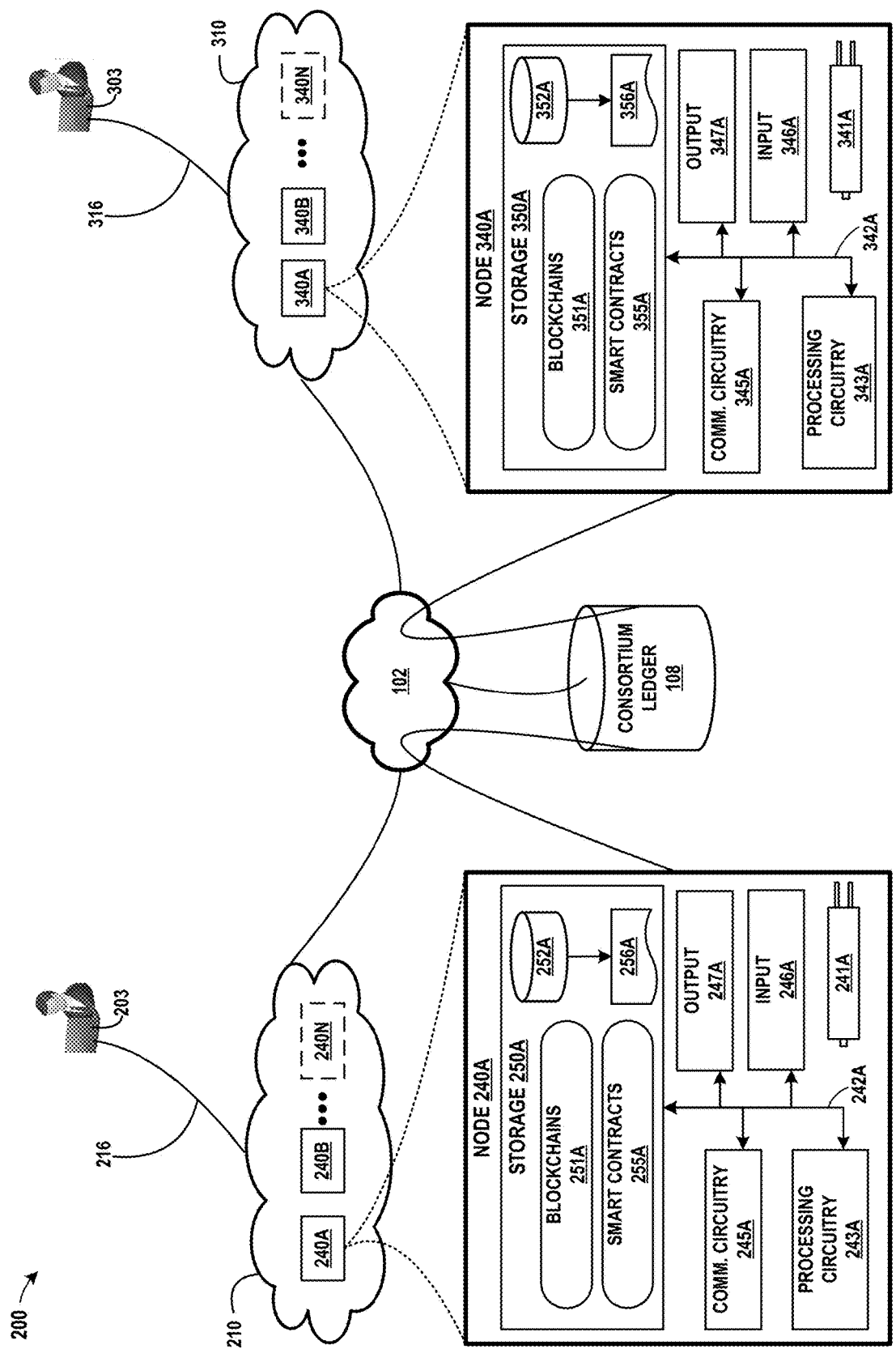
FIG. 2 is a block diagram illustrating an example system in which multiple private consensus networks perform decentralized device identification, in accordance with one or more aspects of the present disclosure.

FIG. 2 is a block diagram illustrating an example system in which multiple private consensus networks perform decentralized device identification, in accordance with one or more aspects of the present disclosure. System 200 of FIG. 2 may be described as an example or alternative implementation of system 100 of FIG. 1. Some aspects of FIG. 2 are described herein within the context of FIG. 1. In the example of FIG. 2, system 200 includes consortium ledger 108, private consensus network 210, private consensus network 310, and client devices 203 and 303, all connected through network 102. In accordance with aspects of this disclosure, client device 203 may access rules 216, partially or completely, at a time of being bootstrapped to a private distributed ledger of private consensus network 210. Similarly, in accordance with these aspects of this disclosure, client device 303 may access rules 316, partially or completely, at a time of being bootstrapped to the respective private distributed ledger of private consensus network 310. Each of private consensus network 210 and private consensus network 310 generally corresponds to one of private consensus networks 110 of FIG. 1. For ease of illustration, only private consensus networks 210 and 310 are illustrated in FIG. 2, although techniques in accordance with one or more aspects of the present disclosure may be performed with many more private consensus networks.

Also, each of nodes 240A through 240N (collectively "nodes 240") shown within private consensus network 210 and each of nodes 340A through 340N (collectively "nodes 340") shown within consensus network 310 of FIG. 2 may generally correspond to nodes 114 included within private consensus networks 110 of FIG. 1. These devices, systems, and/or components may be implemented in a manner consistent with the description of the corresponding system provided in connection with FIG. 1, although in some examples, such systems may involve alternative implementations with more, fewer, and/or different capabilities. In general, systems, devices, components, and other items illustrated in FIG. 2 may correspond to like-numbered systems, devices, components, and items illustrated in FIG. 1, and may be described in a manner consistent with the description provided in connection with FIG. 1. As such, one or both of private consensus networks 210 and 310 may represent IoT-friendly environments, and one or more of nodes 240 and 340 may represent IoT devices of varying capabilities and complexity.

Any or all of network 102, consensus network 210, and/or consensus network 310 may be communicating using the Internet. For instance, network 102 and private consensus networks 210 and 310 may each utilize a cellular, Wi-Fi®, ZigBee, Bluetooth, Near-Field Communication (NFC), satellite, enterprise, service provider, and/or other type of network enabling transfer of transmitting data between computing systems, servers, IoT devices, and other computing devices. One or more of client devices, server devices, or other devices may transmit and receive data, commands, control signals, and/or other information across the networks illustrated in FIG. 2 using any suitable communication techniques.

Network 102, private consensus network 210, and/or private consensus network 310 may include communication hardware of various communication ranges and wireless/wire-based capabilities, such as one or more network hubs, network switches, network routers (wired and/or wireless), satellite dishes, set-top boxes, Ethernet® cards, WiFi® receivers, RFID readers/transmitters, or any other network equipment. Such devices or components may be operatively inter-coupled, thereby providing for the exchange of information between computers, devices, or other components (e.g., between one or more IoT devices or systems and one or more server devices or systems). Each of the devices or systems illustrated in FIG. 2 may be operatively coupled to the networks shown in FIG. 2 using one or more network links. The links coupling such devices or systems may be Ethernet or other types of network connections, and such connections may be wireless and/or wired connections. One or more of the devices or systems illustrated in FIG. 2 or otherwise on network 102, private consensus network 210, and/or private consensus network 310 may be in a remote location relative to one or more other illustrated devices or systems.

Client devices 103 and 303 may be implemented as any suitable client computing system, such as a mobile, non-mobile, wearable, and/or non-wearable computing device. Client device 103 and 303 may, in various use case scenarios, represent a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, or non-mobile computing device that may perform operations in accordance with one or more aspects of this disclosure.

Each of nodes 240A through 240N (shown within private consensus network 210) and each of nodes 340A through 340N (shown within private consensus network 310) may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, one or more of nodes 240 and/or nodes 340 collectively form or represent an IoT ecosystem, cloud computing system, server farm, and/or server cluster (or portion thereof) that provides services to client devices and other devices or systems. In other examples, nodes 240 and nodes 340 may represent or be implemented through one or more virtualized compute instances (e.g., virtual machines, containers) of a data center, cloud computing system, server farm, and/or server cluster. For instance, any or all of nodes 240 or nodes 340 may be implemented as IoT devices.

In the example of FIG. 2, node 240A, for example, may include power source 241A, processing circuitry 243A, one or more communication circuitry units 245A, one or more input devices 246A, one or more output devices 247A, and one or more storage devices 250A. Storage devices 250A may store one or more blockchains 251A, ledger data store 252A, smart contracts 255A, and rules 256A. One or more of the devices, modules, storage areas, or other components of node 240A are interconnected to enable inter-component communications (physically, communicatively, and/or operatively). In some examples, such connectivity may be provided by through communication channels (e.g., communication channels 242A), a system bus, a network connection, an inter-process communication data structure, or any other hardware capable of communicating data. In general, any given "node 240N" may include components that correspond to those illustrated with respect to node 240A.

Similarly, also in the example of FIG. 2, node 340A may include power source 341A, processing circuitry 343A, one or more communication circuitry units 345A, one or more input devices 346A, one or more output devices 347A, and one or more storage devices 350A. storage devices 350A of node 340A stores blockchains 351A, ledger data store 352A, smart contracts 355A, and rules data 356A. the devices, modules, storage areas, and other components of node 340A are interconnected via communication channels 342A, which may incorporate hardware components that correspond to the hardware described above with respect to communication channels 242A of node 240A. In general, any given "node 340N" may include components that correspond to those illustrated with respect to node 340A.

In this disclosure, processing circuitry 243A through 243N and processing circuitry 343A through 343N may be collectively referred to as "processing circuitry 243" or "processing circuitry 343," respectively. Communication circuitry units 245A through 245N and communication circuitry units 345A through 345N may be collectively referred to as "communication circuitry units 245" and "communication circuitry units 345," respectively. As used herein generally, "N" is any number such that "processors 243" represents any number/amount of processing circuitry 243 and "communication circuitry units 245" represents any number of communication circuitry units 245. Correspondingly, for other components, devices, units, or modules that are illustrated or described using a similar numbering and letter convention, such components, devices, units, or modules may be referred to collectively in a similar fashion. In some examples, one or more nodes 240 may include greater or fewer capabilities, features, components, and/or functionality than other nodes 240. For certain nodes 240, one or more components, devices, or modules shown in FIG. 2 as being included within one or more nodes 240 may be optional.

Certain aspects of nodes 240 are described below with respect to node 240A. Other nodes 240 (e.g., node 240B through node 240N) and nodes 340 (shown within consensus network 310) may be described similarly, and may also include the same, similar, or corresponding components, devices, modules, functionality, and/or other features. Descriptions herein with respect to node 240A may therefore correspondingly apply to one or more other nodes 240 (e.g., node 240B through node 240N). For example, the description of processing circuitry 243A of node 240A may also apply to processing circuitry 243B of node 240B. Further, such descriptions may apply also to nodes 340 (e.g., node 340A through node 340N), and specifically to illustrated node 340A, which also includes similarly numbered components corresponding to both node 240A and node 240B. Accordingly, the description of processing circuitry 243A of node 240A may also correspondingly apply to processing circuitry 343A of node 340A.

Power source 241A of node 240A may provide power to one or more components of node 240A. Power source 241A may receive power from the primary alternating current (AC) power supply in a building, home, or other location. In other examples, power source 241A may be a battery or a device that supplies direct current (DC). In still further examples, node 240A and/or power source 241A may receive power from another source. One or more of the devices or components illustrated within node 240A may be connected to power source 241A, and/or may receive power from power source 241A. Power source 241A may have intelligent power management or consumption capabilities, and such features may be controlled, accessed, or adjusted by one or more modules of node 240A and/or by processing circuitry 243A to intelligently consume, allocate, supply, conserve, or otherwise manage power.

Processing circuitry 243A of node 240A may implement functionality and/or execute instructions associated with node 240A or associated with one or more modules illustrated herein and/or described below. Processing circuitry 243A may be, may be part of, and/or may include programmable processing circuitry and/or fixed-function circuitry that performs operations in accordance with one or more aspects of the present disclosure. Example implementations of processing circuitry 243A may include, be, or be part of one or more microprocessors, application processors, display controllers, auxiliary processors, graphics processors, central processing units, one or more sensor hubs, and any other hardware configured to function as a processing device. Node 240A may invoke processing circuitry 243A to perform operations in accordance with one or more aspects of the present disclosure using hardware, firmware, software, or a mixture of hardware, software, and firmware residing in and/or executing at node 240A.

Communication circuitry unit 245A may enable node 240A to communicate with devices external to node 240A by transmitting and/or receiving data, and may operate, in some respects, as both an input device and an output device. In some examples, communication circuitry unit 245A may enable node 240A to communicate with other devices over a network. In other examples, communication circuitry unit 245A may send and/or receive radio signals on a radio network such as a cellular radio network. In other examples, communication circuitry unit 245A of node 240A may transmit and/or receive satellite signals on a satellite network such as a Global Positioning System (GPS) network. Examples of communication circuitry units 245A include network interface cards (such as Ethernet® cards or WiFi® cards), an optical transceiver, a radio frequency transceiver, a GPS receiver, an RFID transmitter or reader, or any other type of device that can send and/or receive information. Other examples of communication circuitry units 245A may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

Input devices 246A may represent any input devices of node 240A not otherwise separately described herein. One or more input devices 246A may generate, receive, and/or process input from any type of device capable of detecting input from a human or machine. For example, one or more input devices 246A may generate, receive, and/or process input in the form of electrical, physical, audio, image, and/or visual input (e.g., peripheral device, keyboard, microphone, camera). Output devices 247A may represent any output devices of node 240A not otherwise separately described herein. One or more output devices 247A may generate, receive, and/or process input from any type of device capable of detecting input from a human or machine. For example, one or more output devices 247A may generate, receive, and/or process output in the form of electrical and/or physical output (e.g., peripheral device, actuator, etc.).

Storage devices 250A may store information for processing during operation of node 240A. In various examples, storage devices 250 may include internal storage positioned within node 240A, or may represent external storage, such as removable storage or external hard drives or solid state drives (SSDs), or may incorporate both internal and external storage components. Storage devices 250A may store program instructions and/or data associated with one or more of the units/modules described in accordance with one or more aspects of this disclosure.

Processing circuitry 243A and one or more storage devices 250A collectively provide an operating environment or platform for the units/modules described herein, which may be implemented as software, but may in some examples include any combination of hardware, firmware, and software. Processing circuitry 243A may execute instructions and one or more storage devices 250A may store instructions and/or data of one or more modules. The combination of processing circuitry 243A and storage devices 250A may, in concert, retrieve, store, and/or execute the instructions and/or data of one or more applications, modules, or software. Processing circuitry 243A and/or storage devices 250A may also be operably/communicatively coupled to one or more other components, including, but not limited to, one or more of the components of node 240A and/or one or more devices or systems illustrated as being connected to node 240A.

In some examples, one or more storage devices 250A are temporary memories, meaning that a primary purpose of the one or more storage devices is not long-term storage. Storage devices 250A of node 240A may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 250A, in some examples, also include one or more computer-readable storage media. Storage devices 250A may be configured to store larger amounts of information than volatile memory. Storage devices 250A may further be configured for long-term storage of information as non-volatile memory space and retain information after activate/off cycles. Examples of non-volatile memories include magnetic (or "spinning") hard drives, optical discs, solid state drives (SSDs), Flash memories, or forms of electrically programmable memories (EPROM) or electrically erasable and programmable (EEPROM) memories.

Blockchains 251A represent functions relating to adhering to protocols and/or procedures of a consensus network, which in the case of node 240A, includes private consensus network 210. Blockchains 251A may invoke communication circuitry unit 245A to communicate with one or more nodes 240 within consensus network 210 pursuant to a consensus algorithm or blockchain protocol, to cause one or more of the other nodes 240 to update distributed ledger information maintained by the other nodes 240. Blockchains 251A may also update ledger data store 252A, and verify that ledger data store 252A is consistent with other ledger data stores 252 included across consensus network 210. In this way, blockchains 251A represent a locally stored updating/compliance mechanism with respect to node 240A's functioning under the auspices of private consensus network 210.

Blockchain module 251A may output information to smart contract module 255A. Blockchain module 251A may follow a consensus protocol to verify the validity of the instructions to modify ledger data store 252A. Blockchain module 251A may implement one or more blockchain services of a distributed computing platform. Blockchain module 251 may, for example, implement services of an Ethereum computing platform or one or more Hyperledger-based blockchains or related tools. Blockchains 251A may be described in connection with FIG. 2 as primarily performing operations relating to consensus networks, blockchain module 251A may alternatively, or in addition, perform other operations. In some examples, functions performed by blockchain module 251A could be performed by software or by a hardware device executing software. In other examples, functions performed by blockchain module 251A may be implemented primarily or partially through hardware.

Ledger data store 252A may represent any suitable data structure or storage medium for storing information in a distributed ledger. In various examples, ledger data store 252A includes data copied from a private distributed ledger of private consensus network 210 and/or data copied from consortium ledger 108. As shown in FIG. 2, node 240A is directly connected to consortium ledger 108 via network 102, making node 240A an edge device of private consensus network 210. As such, ledger data store 252A may include data copied directly from consortium ledger 108. The information stored in ledger data store 252A may be searchable and/or categorized such that various components of node 240A are capable of providing input requesting information from ledger data store 252A. In response to such input requesting information from ledger data store 252A, the requesting component(s) of node 240A may receive information stored within ledger data store 252A.

Smart contracts 255A and 355A represent functions relating to interpreting platform-independent information about carrying out the provisions or terms of various rules set forth in blockchains 251A and 351A. Smart contracts 255A and 355A may include information about various network compliance-based constraints, such as constraints with respect to becoming identity-verified and functioning within private consensus networks 210 and 310, respectively. Smart contracts 255A and 355A may enable nodes 240A and 340A to identify operations that are to be performed to function within the confines of private consensus networks 210 and 310. Although smart contracts 255A and 355A are described above as being primarily interpretation-related and enforcement-related, smart contracts 255A and 355A may alternatively, or in addition, govern other operations, as well.

The techniques of this disclosure leverage public network 102, via consortium ledger 108, while maintaining anonymity of devices for which anonymity is a priority, while exposing only those devices (namely, the edge devices) for which anonymity is less of a priority. Further, the reduction in the above-mentioned operations reduces complexity, communication frequency, bandwidth consumption, and electrical power consumption. That is, according to the techniques of this disclosure, nodes 203 and 303 may leverage private distributed ledgers to implement a decentralized P2P device identification scheme within private consensus networks 210 and 310, while using consortium ledger 108 for cross-network synchronization that cuts down on the need for API integration.

Components illustrated in FIG. 2 and/or illustrated or described elsewhere in this disclosure may be implemented as hardware, or hardware implementing software, or as firmware. For instance, one or more of the components may represent processing circuitry (e.g., fixed function circuitry and/or programmable processing circuitry) residing in and/or executing at one or more computing devices. For example, a computing device may execute one or more of the recited components as a virtual machine executing on underlying hardware, whether as services of an operating system or other computing platform. In some examples, functionalities described above may execute as executable programs at an application layer of a computing platform. In other examples, functionality provided by a module could be implemented by a dedicated hardware device (e.g., FPGA, ASIC, etc).

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIGS. 3A and 3B are illustrations of example code listings that represent device identity verification operations. FIG. 3A illustrates code corresponding to an algorithm for an identification protocol. For instance, any of the trusted ones of nodes 114 (node 114A is discussed herein as a non-limiting example) may receive an identity request from a currently unidentified node (node 114N is discussed herein as a non-limiting example). Upon receiving the identity request, node 114A may send a request to a distributed ledger for a smart contract for the identification protocol. According to blockchain-based identification technologies, node 114A sends the request to private distributed ledger 112A, and obtains the identification protocol from private distributed ledger 112A. The code illustrated in FIG. 3A represents a smart contract 320 that node 114A-1 would obtain from private distributed ledger 112A according to blockchain-based identification technology.

In some examples, smart contract 320 of FIG. 3A is added to private distributed ledger 112A at the time of ledger genesis. More specifically, smart contract 320 defines rules for providing device (e.g., IoT device) identity on a P2P basis within a private consensus network, such as private consensus network 110A in this example. Smart contract 320 represents the protocol for obtaining a decentralized identifier (DID) on a P2P basis. Decentralized identifier formation (e.g., as implemented by node 114A-N) is not governed by the topology of private consensus network 110A, but rather, by the visibility of the IoT devices connected via private consensus network 110A, and by the visibility of private distributed ledger 112A to nodes 114A. Again, the use of private distributed ledger 112A for obtaining the identification protocol is associated with existing blockchain-based device identification techniques.

FIG. 3B illustrates code corresponding to a decentralized identifier document 340. decentralized identifier document 340 of FIG. 3B includes public keys of those of nodes 114A that are decentralized identifier participants. Decentralized identifier document 340 also includes signatures that confirm the possession of private keys and smart contracts that provided the protocol to form decentralized identifier document 340. Moreover, decentralized identifier document 340 includes a context that identifies the particular distributed ledger that can be used to process the decentralized identifier document. In the particular example of FIG. 3B, the context refers to a "c1ledger," which, in accordance with existing blockchain-based decentralized identifier technology, identifies private distributed ledger 112A.

Node 114A-1 may generate a decentralized identifier transaction request upon obtaining decentralized identifier document 340. For instance, in the case of an existing blockchain-based decentralized identifier transaction, node 114A-1 may process the decentralized identifier transaction via private distributed ledger 112A. For instance, according to these existing techniques, private distributed ledger 112A enables the requesting a trusted IoT device (node 114A-1 in this example) to implement a consensus mechanism among the remaining trusted IoT devices of private consensus network 110A. That is, the trusted devices of nodes 114A may collectively determine whether the decentralized identifier of node 114A-N is to be added to decentralized identifier document 340, using a consensus-based mechanism. According to many existing blockchain-based identification technologies, private distributed ledger 112A may determine a consensus based on the concept of Byzantine Fault Tolerance (BFT).

In one example of a BFT-based consensus mechanism, private distributed ledger 112A may set a threshold of malicious devices according to the following equation:

$$F=(N-1)/3$$

where 'F' represents the number of malicious devices in private consensus network 110A, and 'N' represents the total number of devices in private consensus network 110A. One way in which private consensus ledger 112A enables trusted IoT devices of nodes 114A to identify a device as "malicious" is to detect a forged DID in a communication received from such a device.

On the other hand, if the trusted nodes of nodes 114A determine, via consensus or quorum, that node 114A-N advertised a valid DID by way of the identity verification request, then one or more of nodes 114A enter the DID of node 114A-N into private distributed ledger 112A. Upon verification via the consensus mechanism specific to private consensus network 112A, node 114A-N becomes classified as an identification-verified or "permissioned" node. Upon becoming permissioned in this fashion, node 114A-N is configured to run the consensus protocol specified in private distributed ledger 112A in conjunction with the other permissioned ones of nodes 114A, to identify future block(s) to be added to private distributed ledger 112A. For instance, upon being verified via the consensus mechanism, node 114A-N may have a vote in future IoT device identification or identity-verification decisions. Again, the use of private distributed ledger 112A alone for device identification or identity-verification decisions is associated with existing blockchain-based device identification techniques.

The existing blockchain-based device identification mechanisms described above present security challenges in several use case scenarios, such in IoT environments. For instance, IoT devices of differing functionality and computing capabilities can be deployed across private consensus networks 110, 210, 310. Moreover, the different IoT devices might communicate in different contexts, as in the example of sensors that send data back to the parent cloud, or P2P devices that communicate directly with each other. Moreover, IoT devices may communicate across different logical boundaries, as in the example of a connected device that communicates across different clouds or in the example of a publicly visible device offering certain services. According to many IoT architectures, the devices send data back to the cloud in all situations, and any intercommunication between peer devices is routed via the cloud. Direct P2P (device to device) communication tends to be limited by device identity issues and security concerns.

According to existing technologies, the management of the device identity is implemented in the forms of device registries or with the use of public key infrastructure (PKI). PKI-based systems are centralized in nature, in that identity management is implemented in a hub-and-spoke manner. PKI-based systems, when scaled to accommodate the ever-growing number and variety of IoT devices (which can range from very small sensors to a compute intense edge device) present a serious challenge in managing the lifecycle of PKI certificates. Moreover, because several of the IoT devices are not positioned in data centers behind firewalls, but rather, exposed to open, publicly accessible networks, the existing architectures can open up the IoT networks to possible security attacks in various forms, such as threat arising from forged identities and maliciously causing a certificate authority (CA) to sign a PKI certificate formed from a forged identity.

To mitigate or eliminate the concerns described above, this disclosure provides a decentralized context-based device identity system that can be implemented with respect to various types of networks that use distributed ledger technology. According to system configurations of this disclosure, a device's identity in a network, once established, is stored to a consortium ledger, which is accessible via a public network such as the Internet. The system configurations of this disclosure enable the identity of the device to be established not by a central authority, but rather, by other devices in the same context, such as peer devices in the same IoT network, and enable the storage of the device identity in a publicly accessible consortium ledger. The unit of identity according to the system configurations of this disclosure is known as a Decentralized Identifier (DID). DIDs are formed between entities that are fully under the control of the DID constituents, and are independent from any centralized registry, identity provider, or certificate authority. In turn, edge devices of the various IoT networks are configured to store and retrieve the DID information with respect to the publicly accessible consortium ledger.

Existing centralized systems of device identification present certain security concerns. While the addition of a greater number of peer devices in a private consensus network over time might reduce the pervasiveness of malicious devices gaining identity verification using forged identities, the peer devices are also susceptible to device crashes or frequent replacement, particularly in an IoT environment.

Possible reasons for a device to be deemed noncompliant in a centralized DID-based system include the device being identified as a malicious node, or if the device's private key has been compromised. The error-recovery techniques of the existing centralized systems are premised on periodically resolving the identity of a device within a single context, i.e., using a single private distributed ledger (or private "context" ledger). While these recovery techniques are well-suited to use case scenarios involving a single-group deployment of devices that communicate over the cloud with a centralized organization, many real-world systems involve multiple contexts with identity verification constraints defined over multiple contexts. The system configurations of this disclosure aim to mitigate these issues by providing a decentralized identity verification mechanism for distributed ledger-based networks involving multiple contexts.

According to techniques of this disclosure, the identity revocation is governed by certain constraints. Upon one of the nodes of a private consensus network submitting a revocation request (for another device) via the respective private distributed ledger, the revocation transaction is only implemented if a BFT-satisfying number of peer nodes within the private consensus network approve the revocation request. Provided that the BFT-satisfying number of peer nodes approve, the DID/IP is blacklisted.

Figure 4:
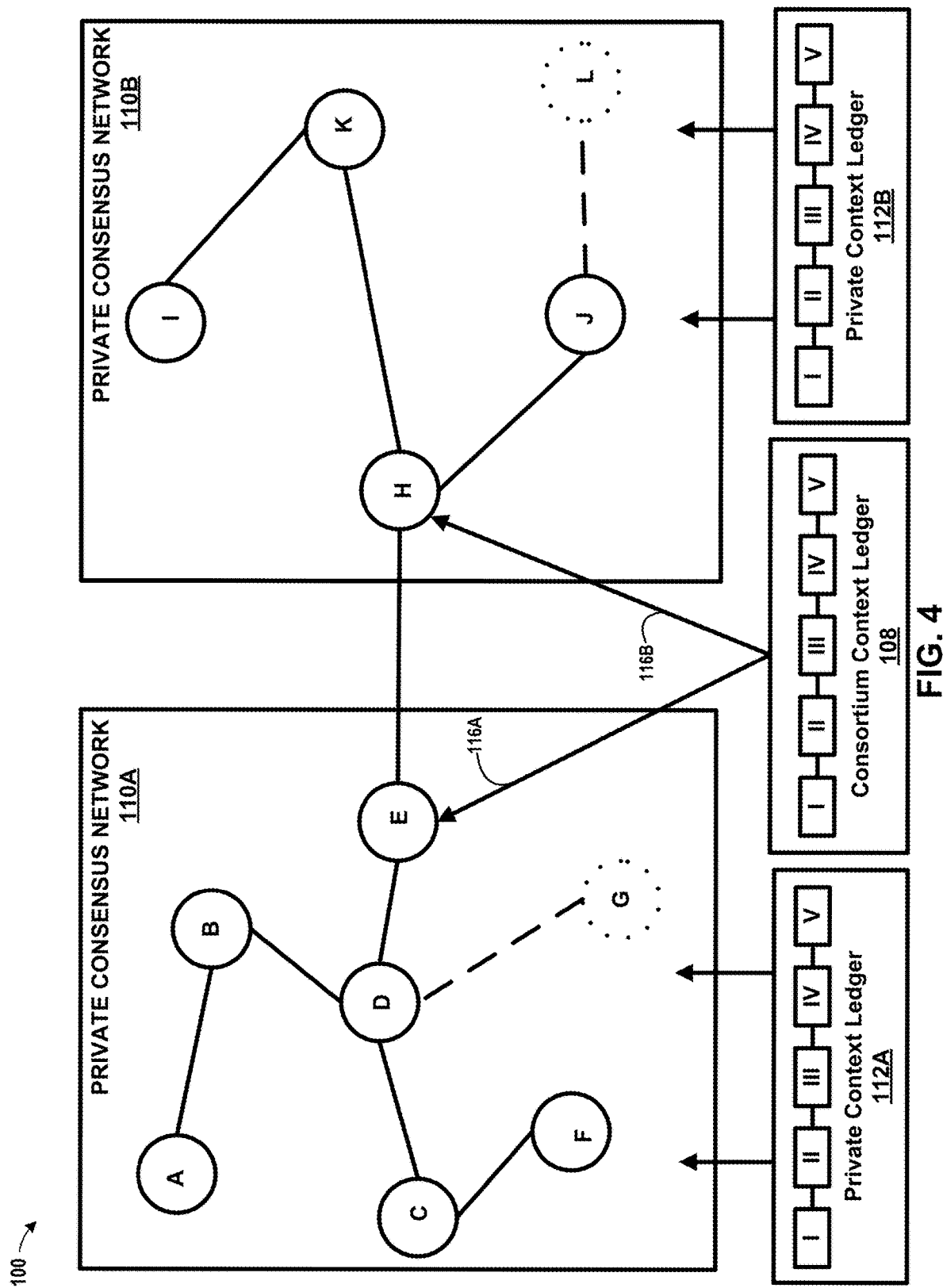
FIG. 4 is a conceptual diagram illustrating certain portions of the system of FIG. 1 in greater detail.

FIG. 4 is a conceptual diagram illustrating certain portions of system 100 of FIG. 1 in greater detail. FIG. 4 illustrates private consensus networks 110A and 110B of system 100, although, in accordance with the aspects of this disclosure, system 100 may include numerous private consensus networks in addition to the two that are shown in FIG. 4. In the use case scenario shown in FIG. 4, private consensus networks 110A and 110B represent IoT networks. Private consensus network 110A includes IoT devices A-G, in which IoT devices A-F have passed the identification procedures specific to private consensus network 110A. Private consensus network 110B includes IoT devices H-L, in which IoT devices H-K have passed the identification procedures specific to private consensus network 110B. IoT devices G and L are illustrated using dotted-line borders, to indicate that IoT devices G and L have requested identity verification onto private consensus networks 110A and 110B respectively, but are still awaiting a quorum of peer approval of their respective identity verification requests. Private distributed ledgers 112 of FIG. 1 are referred to as private context ledgers 112 in FIG. 4, and consortium ledger 108 of FIG. 1 is referred to as consortium context ledger 108 in FIG. 4.

Each of private distributed ledgers 112 represents a shared database or data store. The "blockchain" structure of private distributed ledgers 112 is based on each of private distributed ledgers 112 including a plurality of blocks, where each of blocks I-V (other than the root block, block I) references at least one block created at an earlier time. Each block bundles one or more transactions registered within private distributed ledgers 112, and each block is secured cryptographically. Each respective private consensus network 110 may receive transactions from the respective nodes 114 internal to the respective private consensus network 110, and/or from computing devices external to the respective private consensus network 110 that invoke functionalities of the respective private distributed ledger 112. For instance, the received transaction(s) may modify a given distributed ledger 112 stored within a consensus network. Each of private consensus networks 110 uses the respective private distributed ledger 112 stored within, for IoT device verification.

Moreover, each block II-V of each of private distributed ledgers 112 typically contains a hash pointer as a link to a previous block I-IV, along with a timestamp, and transaction data for the recorded transaction(s). By design, private distributed ledgers 112 are inherently resistant to modification of previously stored transaction data. Functionally, each of private distributed ledgers 112 may be distributed across multiple trusted nodes of the nodes 114 of the respective private consensus network 110, where the trusted nodes 114 are capable of recording transactions between parties efficiently and in a verifiable and permanent way. Consortium context ledger 108 implements a blockchain structure similar to the blockchain structure described above with respect to private distributed ledgers 112. While each of private distributed ledgers 112 and consortium context ledger 108 are illustrated in FIG. 4 as including exactly five blocks for simplicity, private distributed ledgers 112 and consortium context ledger 108 may include numerous (and varying numbers of) blocks in practice.

IoT device E represents an edge device of private consensus network 110A, and IoT device H represents an edge device of private consensus network 110B. IoT devices E and H are also authorized to participate in inter-organizational communications, as illustrated in FIG. 4 by way of the logical connection between IoT devices E and H. In accordance with aspects of this disclosure IoT device E may obtain rules 116A from consortium context ledger 108, and IoT device H may obtain rules 116B from consortium context ledger 108. Rules 116A and 116B represent rules specific to cross-network identity verification onto consortium context ledger 108. IoT devices E and H may use rules 116 to determine how to vote when evaluating identity verification requests from other edge devices with respect to consortium context ledger 108. By using consortium context ledger 108 to determine whether to approve or deny cross-network identity verification requests received from new devices in a P2P manner, IoT devices E and H may leverage techniques of this disclosure to reduce or even eliminate the need for computing resource-heavy cross-API integration. In this way, the techniques of this disclosure reduce complexity, mitigate bandwidth usage, and cut down on electrical power consumption.

The techniques of this disclosure enable edge devices (in this example, IoT devices E and H) to process smart contracts with private context ledgers 112 to form the DID documents for private consensus networks 110A and 110B, respectively. In turn, IoT devices E and H may distribute the DID information obtained from private context ledgers 112 to enable peer identification decisions. That is, IoT devices A-F consult private context ledger 112, and IoT devices I-J consult private context ledger 112 to obtain rules of the game with respect to identification requests received from IoT devices G and L. Using the rules obtained from private context ledgers 112, IoT devices A-F and I-J may perform the peer identification decision with respect to IoT devices G and L in a P2P manner, while reducing or even eliminating the need for each trusted device to connect with a private cloud to individually make the identity verification determinations. In this way also, the techniques of this disclosure reduce complexity, mitigate bandwidth usage, and cut down on electrical power consumption.

Moreover, in this way, the system configurations of this disclosure provide a decentralized identity verification mechanism in which anonymity is maintained where anonymity is a priority, and public access is leveraged where anonymity is not a priority. That is, in the example of FIG. 4, anonymity may be a priority with respect to IoT devices B-F and IoT devices I-K, and as such, IoT devices B-F and IoT devices I-K do not participate in any inter-organization communication or directly access consortium context ledger 108. Conversely, public access is a greater priority with respect to the edge devices, namely, IoT devices E and H, and as such, IoT devices E and H communicate with each other and with consortium context ledger 108.

Thus, the system configurations of this disclosure provide a decentralized architecture by which peer devices can perform device identification, while maintaining anonymity as desired. That is, the peer devices verify identity and grant/deny identity verification, instead of a centralized CA. Moreover, identity revocation may be simplified in instances of private key compromises and/or other malicious device behavior.

Figure 5:
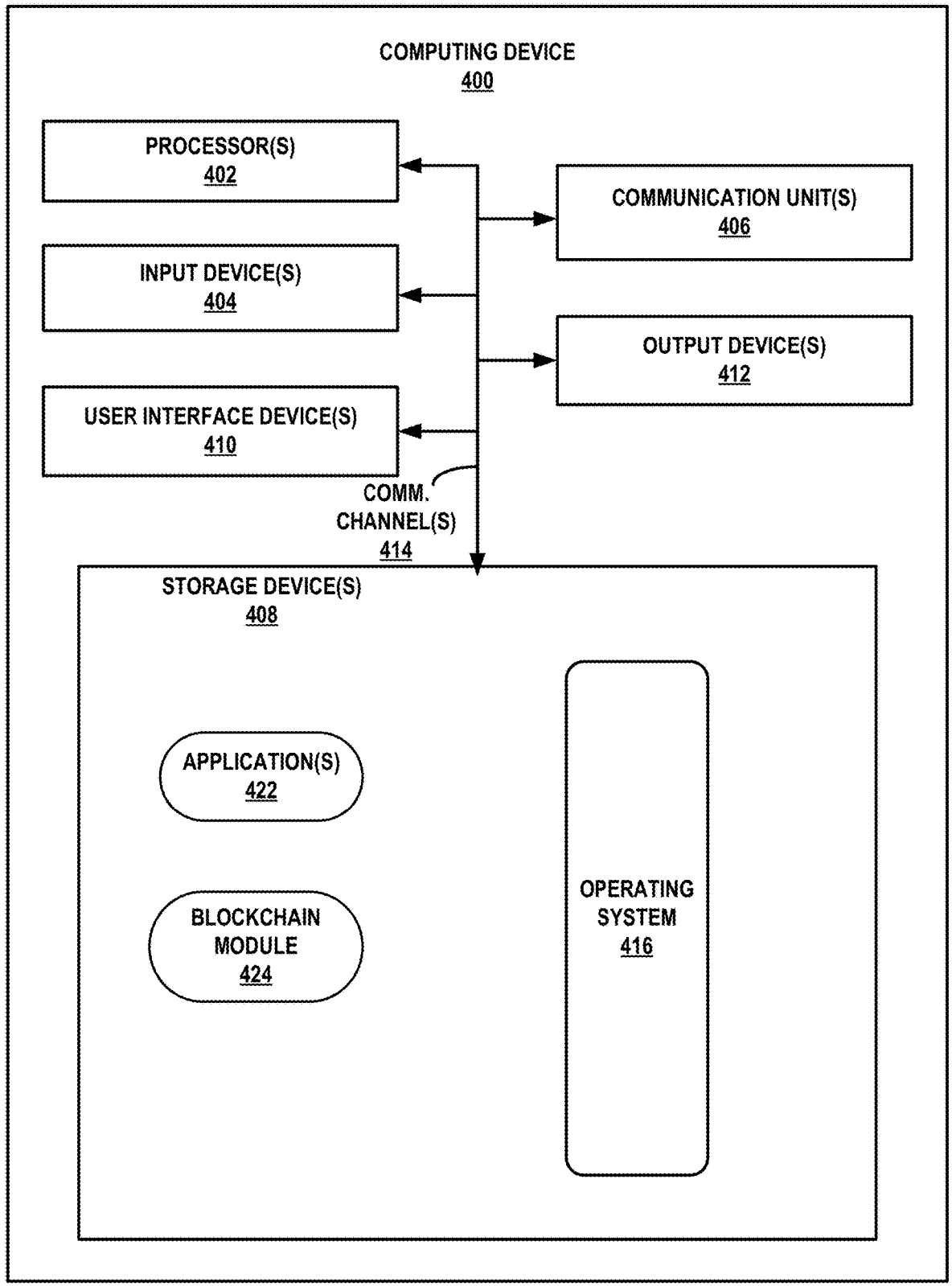
FIG. 5 is a block diagram illustrating an example computing device that operates in accordance with one or more techniques of this disclosure.

FIG. 5 is a block diagram illustrating an example computing device 400 that operates in accordance with one or more techniques of this disclosure. Computing device 400 represents a non-limiting example of any of nodes 114 of FIG. 1, and is described herein as an implementation of node 114A-1, which is an edge device of private consensus network 110A. For example, blockchain module 424 may store information obtained from consortium ledger 108, private distributed ledger 112A, or both. Computing device 400 includes one or more processors 402 for executing any one or more of application(s) 442, operating system 416, blockchain module 424, and/or other functionalities described herein. Although shown in FIG. 5 as a stand-alone computing device 400 for purposes of example, a computing device may be any component or system that includes one or more processors or other suitable computing environment for executing software instructions and, for example, need not necessarily include one or more elements shown in FIG. 5 (e.g., communication units 406; and in some examples, components such as storage device(s) 408 may not be co-located or in the same chassis as other components).

Computing device 400 includes one or more processors 402, one or more input devices 404, one or more communication units 406, one or more output devices 412, one or more storage devices 408, and one or more user interface (UI) device(s) 410. Application(s) 422, operating system 416, and blockchain module 424 are stored to storage device(s) 408, and executable by components of computing device 400, such as by processor(s) 402. Each of components 402, 404, 406, 408, 410, and 412 are coupled (physically, communicatively, and/or operatively) for inter-component communications. In some examples, communication channels 414 may include a system bus, a network connection, an inter-process communication data structure, or any other structure suitable for communicating data in various formats, such as electrical signals. As one example, components 402, 404, 406, 408, 410, and 412 may be coupled by one or more communication channels 414.

Processors 402, in one example, are configured to implement functionality and/or process instructions for execution within computing device 400. For example, processor(s) 402 may be capable of processing instructions stored in storage device 408. Examples of processor(s) 402 may include, any one or more of a microprocessor, a controller, a digital signal processor (DSP), an application specific integrated circuit (ASIC), a field-programmable gate array (FPGA), processing circuitry of various types including fixed function circuitry and/or programmable processing circuitry, or equivalent discrete logic circuitry or integrated logic circuitry.

One or more storage devices 408 may be configured to store information within computing device 400 during operation. Storage device(s) 408, in some examples, are described as a computer-readable storage medium. In some examples, storage device(s) 408 include a temporary memory, meaning that a primary purpose of storage device(s) 408 is not long-term storage. Storage device(s) 408, in some examples, incorporate volatile memory, meaning that these portions of storage device(s) 408 do not maintain stored contents when computing device 400 is turned off. Examples of volatile memories include random access memories (RAM), dynamic random access memories (DRAM), static random access memories (SRAM), and other forms of volatile memories known in the art. In some examples, storage device(s) 408 are used to store program instructions for execution by processor(s) 402. Storage device(s) 408, in one example, may be used by software or applications (e.g., application(s) 422) running on computing device 400 to temporarily store information during program execution.

Storage device(s) 408, in some examples, also include one or more computer-readable storage media. Storage device(s) 408 may be configured to store larger amounts of information than volatile memory. Storage devices(s) 408 may further be configured for long-term storage of information. In some examples, storage device(s) 408 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication units 406. Computing device 400, in one example, utilizes communication units 406 to communicate with external devices via one or more networks, such as one or more wired/wireless/mobile networks. Communication unit(s) 406 may include a network interface card, such as an Ethernet card, an optical transceiver, a radio frequency transceiver, or any other type of device that can send and receive information. Other examples of such network interfaces may include 3G® and WiFi® radios. In some examples, computing device 400 uses communication unit(s) 406 to communicate with an external device.

Computing device 400, in one example, also includes one or more user interface devices 410. User interface device(s) 410, in some examples, are configured to receive input from a user through tactile, audio, or video feedback. Examples of user interface devices(s) 410 include a presence-sensitive display, a mouse, a keyboard, a voice responsive system, video camera, microphone, or any other type of device for detecting a command from a user. In some examples, a presence-sensitive display includes a touch-sensitive screen. In some examples, a user such as an employee of the co-location facility provider may enter configuration data defining metrics for characterizing services.

One or more output devices 412 may also be included in computing device 400. Output device 412, in some examples, is configured to provide output to a user using tactile, audio, or video stimuli. Output device 412, in one example, includes a presence-sensitive display, a sound card, a video graphics adapter card, or any other type of device for converting a signal into an appropriate form understandable to humans or machines. Additional examples of output device 412 include a speaker (e.g., one or more loudspeakers or headphones), a cathode ray tube (CRT) monitor, a liquid crystal display (LCD), or any other type of device that can generate output intelligible to a user.

Computing device 400 may execute operating system 416. Operating system 416, in some examples, controls the operation of components of computing device 400. For example, operating system 416, in one example, facilitates the communication of one or more applications 422 with processors 402, communication unit 406, storage device 408, input device 404, user interface devices 410, and output device 412. Applications 422 may also include program instructions and/or data that are executable by computing device 400.

Blockchain module 424 may perform functions relating to adhering protocols and/or procedures of consensus networks, such as procedures obtained from consortium ledger 108 and/or private distributed ledger 112A. Blockchain module 424 may cause communication unit(s) 406 to communicate with other devices within or outside of private consensus network 110A pursuant to consensus algorithms or blockchain protocols. Blockchain module 424 may follow a consensus protocol to verify, in a P2P manner, the validity of identification requests received from other devices with respect to accessing consortium ledger 108, such as by applying rules 116A obtained from consortium ledger 108. Blockchain module 424 may also follow a consensus protocol to verify, in a P2P manner, the validity of identification requests received from other devices with respect to accessing private consensus networks 110, such as by applying identification rules obtained from private distributed ledgers 112. In some examples, functions performed by blockchain module 424 could be performed by software or by a hardware device executing software. In other examples, functions performed by blockchain module 424 may be implemented primarily or partially through hardware, such as by processing circuitry of computing device 400.

Figure 6:
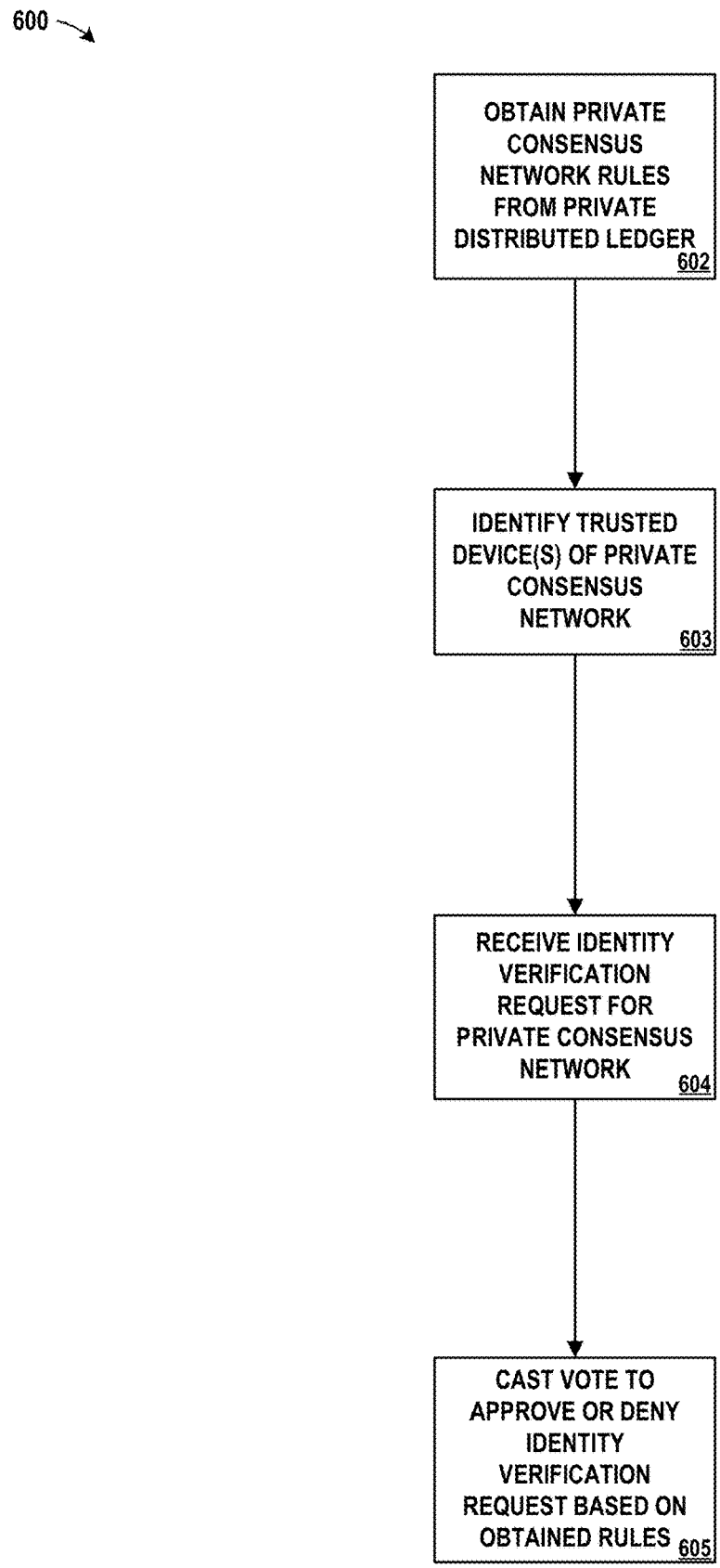
FIG. 6 is a flowchart illustrating an example process that a device of a private consensus network may perform in accordance with the decentralized identity verification techniques of this disclosure.

FIG. 6 is a flowchart illustrating an example process 600 that a device of a private consensus network may perform in accordance with the decentralized identity verification techniques of this disclosure. Process 600 is described herein as being performed by processing circuitry of the edge device. The processing circuitry of the edge device may include, be, or be part of, an ASIC, fixed function circuitry, programmable processing circuitry, any combinations thereof, or other equivalent discrete logic circuitry or integrated circuitry. While process 600 may be performed by a variety of the devices of this disclosure (edge devices and/or private IoT devices), FIG. 6 is described as being performed by node 114A-1 of private consensus network 110, as a non-limiting example. Process 600 may begin when the processing circuitry of a device obtains private consensus network rules from a private distributed ledger (602). For instance, node 114A-1 may obtain rules 116A from private distributed ledger 112A.

In turn, the processing circuitry of the edge device may identify one or more trusted devices positioned within the private consensus network (603). The processing circuitry of the device may receive, via a communications interface of the device, an identity verification request from an unidentified device with respect to the private consensus network (604). In turn, the processing circuitry of the device may, based on the rules obtained from the private distributed ledger, cast a vote on whether to approve or deny the identity verification request (605). Again, the private distributed ledger is accessible only to devices positioned within the private consensus network. In this way, the device, in concert with the other trusted devices of the private consensus network, may implement a decentralized P2P identification mechanism with respect to the identity verification request, without requiring separate accesses to the private network's cloud-based administrator.

In some examples, this disclosure describes a method that includes obtaining, by a first trusted device positioned within a private consensus network, from a private distributed ledger associated with the private consensus network, rules associated with the private consensus network, the private distributed ledger being accessible only to devices positioned within the private consensus network. The method further includes identifying, by the first trusted device, one or more other trusted devices positioned within the private consensus network, and receiving, by the first trusted device, from an unidentified device positioned within the private consensus network, an identity verification request to identify the unidentified device within the private consensus network. The method further includes determining, by the first trusted device based on the rules obtained from the private distributed ledger, whether to approve or deny the identity verification request, and communicating, by the first trusted device, to the one or more other trusted devices, a vote indicative of the determination of whether to approve or deny the identity verification request.

In some examples, determining whether to approve or deny the identity verification request includes determining, by the trusted device, that the unidentified device satisfies device identity verification constraints required by the rules obtained from the private distributed ledger, and also includes approving, by the trusted device, based on the determination that the unidentified device satisfies the device identity verification constraints of the rules obtained from the publicly accessible consortium ledger, the identity verification request received from the unidentified device. In some examples, the method further includes receiving, by the trusted device, a respective vote regarding the identity verification request from each of the other trusted device, determining that the identity verification request is approved by a quorum of a combination of the received votes and the vote communicated by the trusted device, and reclassifying, based on the identity verification request being approved by the quorum, reclassifying the unidentified device as an additional trusted device of the other trusted devices.

In some examples, determining whether to approve or deny the identity verification request includes determining, by the trusted device, that the unidentified device does not satisfy device identity verification constraints of the rules obtained from the private distributed ledger, and denying, by the trusted device, based on the determination that the unidentified device satisfies the device identity verification constraints of the rules obtained from the publicly accessible consortium ledger, the identity verification request received from the unidentified device.

In some examples, the method further includes receiving, by the trusted device, a respective vote regarding the identity verification request from each of the other trusted devices, determining that the identity verification request is denied by a quorum of a combination of the received votes and the vote communicated by the trusted device, and based on the identity verification request being approved by the quorum, maintaining an unidentified classification with respect to the unidentified device. In some examples, the method further includes generating, by the trusted device, in collaboration with one or more of the trusted devices, policy information, and communicating, by the trusted device, the policy information to a cloud system associated with the private consensus network.

In some examples, the trusted device is an edge device of the private consensus network, and the method further includes obtaining, by the edge device, from a publicly accessible consortium ledger associated with a public network, rules associated with the public network, wherein the edge device is identified with respect to the publicly accessible consortium ledger. In these examples, the method further includes identifying, by the edge device, one or more other edge devices that are identified with respect to the publicly accessible consortium ledger, the other edge devices being positioned in other private consensus networks, and receiving, by the edge device, from an unidentified device positioned outside of private consensus network, a consortium ledger identity verification request to be identified within the publicly accessible consortium ledger. In these examples, the method further includes determining, by the edge device, based on the rules obtained from the publicly accessible consortium ledger, whether to approve or deny the consortium ledger identity verification request, and communicating, by the edge device, to the other edge devices that are identified to the publicly accessible consortium ledger, a vote indicative of the determination of whether to approve or deny the consortium ledger identity verification request. In some such examples, the edge device is assigned a first identifier with respect to the private consensus network and a second identifier with respect to the publicly accessible consortium ledger. In some such examples, the private consensus network is a first private consensus network that governs smart grid operations, and wherein the other edge devices that are identified with respect to the publicly accessible consortium ledger include edge devices of a second private consensus network that governs heating and cooling operations and a third private consensus network that governs computer power system operations.

Figure 7:
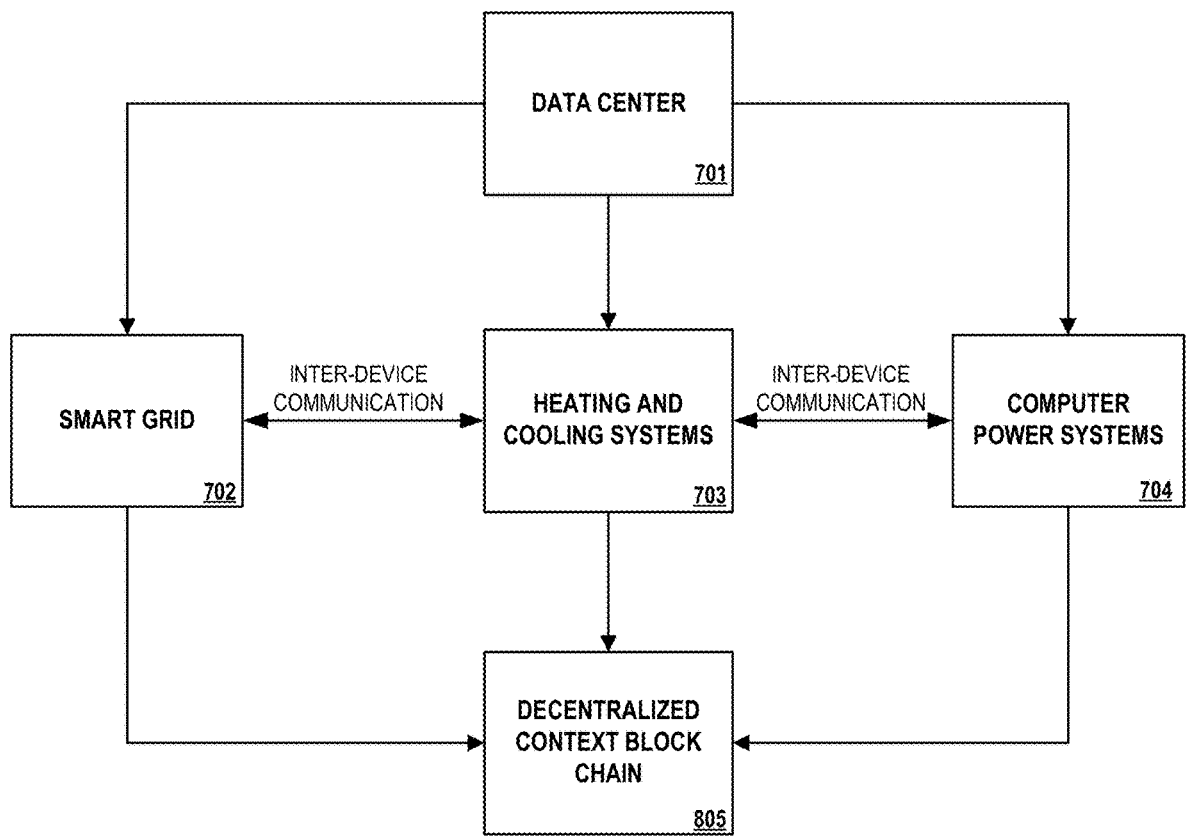
FIG. 7 is a data flow diagram illustrating an example use-case scenario in which the decentralized identity verification technology of this disclosure can be applied in a cross-network setting, using a consortium ledger.

FIG. 7 is a data flow diagram illustrating an example use-case scenario in which the decentralized identity verification technology of this disclosure can be applied in a cross-network setting, using a consortium ledger. The three organizations/sub-organizations involved in the workflow of FIG. 7 are referred to herein as Vendor 1, Vendor 2, and Vendor 3 of a data center 701. For example, data center 701 (e.g., by way of an administrator thereof) may provide requirements or requests to optimal power utilization unit 702, in relation to power utilization guidelines or constraints. An example of an administrator of data center 701 is a data center infrastructure management (DCIM) system of data center 701. In the example of FIG. 7, smart grid sensor 703 is controlled by a first vendor "Vendor 1," heating and cooling system 702 is controlled by a second vendor "Vendor 2", and computer power systems 705 are controlled by a third vendor "Vendor 3."

In the example of FIG. 7, each of smart grid sensor 703, the heat and cooling system 704, and computer power systems 705 may represent a separate private consensus network associated with Vendor 1, Vendor 2, and Vendor 3, respectively. An edge device of each of smart grid sensor 703, heating and cooling system 704, and computer power systems 705 may obtain device identification constraints from consortium ledger 108, which represents a public distributed ledger that is accessible to designated edge devices of Vendor 1, Vendor 2, and Vendor 3. Each of smart grid sensor 703, heating and cooling system 704, and computer power systems 705 represents a respective private consensus network of computing devices, e.g., IoT devices, such as smart heating or cooling devices in example of heating and cooling system 704. Device identification constraints (e.g., as described above with respect to rules 116, in the context of FIG. 7, serve several purposes, such as governing the number of trusted devices that can gain a measure of influence over the various functionalities of data center 701. While consortium ledger 108 is not shown in FIG. 7, the techniques of this disclosure as applied in the use case of FIG. 7 are described with respect to consortium ledger 108 providing the public distributed ledger functionalities that are leveraged by smart grid sensor 703, heating and cooling system 704, and computer power systems 705 in accordance with this disclosure.

The data flow of FIG. 7 also illustrates decentralized identity verification techniques of this disclosure as applied to data center management. The example of FIG. 7 provides for inter-device P2P identification/identity verification between edge devices of smart grid sensor 703, heating and cooling system 704, and computer power systems 705, without reliance on information uploads to individual vendor clouds, thereby mitigating or potentially eliminating resource-heavy cross-API integration. In the use case scenario of FIG. 7, the edge devices of smart grid sensor 703, heating and cooling system 704, and computer power systems 705 collaborate using rules obtained from decentralized context block chain 805 (which may be one example implementation of consortium ledger 108). Inter-device communications between smart grid sensor 703, heating and cooling system 704, and computer power systems 705 are based on the collaborative policy information accessed from decentralized context block chain 805, e.g., at a time of bootstrapping to decentralized context block chain 805. In this way, the consortium ledger-based aspects of this disclosure enable cross-vendor collaboration that uses decentralized context block chain 805, and thereby reduces or eliminates the need for cross-vendor API integration. Thus, the systems of this disclosure reduce complexity, alleviate bandwidth burdens, and potentially reduce electrical power consumption.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, a limited number of devices are shown within the accompanying drawings and/or in other examples referenced herein. However, techniques in accordance with one or more aspects of the present disclosure may be performed with many more of such systems, and collective references to components, devices, modules, and/or systems may represent any number of such components, devices, modules, and/or systems.

The accompanying drawings each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the accompanying drawings and/or may include additional devices and/or components not shown in the accompanying drawings.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific drawings, such systems, devices, and/or components may be implemented in a number of different ways. For instance, one or more devices illustrated in the accompanying drawings as separate devices may alternatively be implemented as a single device; one or more components illustrated as separate components may alternatively be implemented as a single component. Also, in some examples, one or more devices illustrated in the accompanying drawings herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various accompanying drawings herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

Computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), processing circuitry (e.g. programmable processing circuitry and/or fixed-function circuitry), or other equivalent integrated circuitry or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in networks that accommodate a wide variety of devices or apparatuses with varying capabilities, including a wireless handset, a sensor, a mobile or non-mobile computing device, a wearable or non-wearable computing device, an integrated circuit (IC) or a set of ICs (e.g., a chip set). Processors that perform the various functionalities described above may include one or both of programmable processing circuitry and/or fixed function circuitry. Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:

obtaining, by a first trusted device positioned within a private consensus network, from a private distributed ledger associated with the private consensus network, rules associated with the private consensus network, the private distributed ledger being accessible only to devices positioned within the private consensus network;

identifying, by the first trusted device, one or more other trusted devices positioned within the private consensus network;

receiving, by the first trusted device, from an unidentified device positioned within the private consensus network, an identity verification request to identify the unidentified device within the private consensus network;

determining, by the first trusted device based on the rules obtained from the private distributed ledger, whether to approve or deny the identity verification request;

communicating, by the first trusted device, to the one or more other trusted devices, a vote indicative of the determination of whether to approve or deny the identity verification request;

receiving, by the first trusted device, a corresponding vote regarding the identity verification request from each of the other trusted devices; and reclassifying, by the first trusted device and based at least in part on the received votes and the vote communicated by the first trusted device, the unidentified device as an additional trusted device of the other trusted devices, wherein determining whether to approve or deny the identity verification request comprises:

determining, by the first trusted device, that the unidentified device satisfies device identity verification constraints specified by the rules obtained from the private distributed ledger; and approving, by the first trusted device and based on the determination that the unidentified device satisfies the device identity verification constraints specified by the rules obtained from the private distributed ledger, the identity verification request.

2. The method of claim 1, further comprising:

determining that the identity verification request is approved by a quorum of a combination of the received votes and the vote communicated by the first trusted device, wherein reclassifying comprises reclassifying, based on the identity verification request being approved by the quorum, the unidentified device as an additional trusted device of the other trusted devices.

3. The method of claim 1, wherein the unidentified device comprises a first unidentified device, and wherein the identity verification request comprises a first identity verification request, the method further comprising:

receiving, by the first trusted device, from a second unidentified device positioned within the private consensus network, a second identity verification request to identify the second unidentified device within the private consensus network;

determining, by the first trusted device, that the second unidentified device does not satisfy device identity verification constraints of the rules obtained from the private distributed ledger; and based on the determination that the second unidentified device does not satisfy the device identity verification constraints of the rules obtained from the private distributed ledger, denying, by the first trusted device, the second identity verification request received from the second unidentified device;

communicating, by the first trusted device, to the one or more other trusted devices, a vote indicative of the denial of the second identity verification request.

4. The method of claim 3, further comprising:

receiving, by the first trusted device, a corresponding vote regarding the second identity verification request from each of the other trusted devices;

and based on the vote indicative of the denial of the second identity verification request and the received votes regarding the second identity verification request, maintaining an unidentified classification with respect to the second unidentified device.

5. The method of claim 1, further comprising:

generating, by the first trusted device, in collaboration with at least one of the one or more other trusted devices, policy information; and communicating, by the first trusted device, the policy information to a cloud system associated with the private consensus network.

6. The method of claim 1, wherein the first trusted device is an edge device of the private consensus network, the method further comprising:

obtaining, by the edge device, from a publicly accessible consortium ledger associated with a public network, rules associated with the public network, wherein the edge device is identified with respect to the publicly accessible consortium ledger;

identifying, by the edge device, one or more other edge devices that are identified with respect to the publicly accessible consortium ledger, the other edge devices being positioned in other private consensus networks;

receiving, by the edge device, from an unidentified device positioned outside of private consensus network, a consortium ledger identity verification request to be identified within the publicly accessible consortium ledger;

determining, by the edge device, based on the rules obtained from the publicly accessible consortium ledger, whether to approve or deny the consortium ledger identity verification request; and communicating, by the edge device, to the other edge devices that are identified to the publicly accessible consortium ledger, a vote indicative of the determination of whether to approve or deny the consortium ledger identity verification request.

7. The method of claim 6, wherein the edge device is assigned a first identifier with respect to the private consensus network and a second identifier with respect to the publicly accessible consortium ledger.

8. The method of claim 7, wherein the private consensus network is a first private consensus network that governs smart grid operations, and wherein the other edge devices that are identified with respect to the publicly accessible consortium ledger include edge devices of a second private consensus network that governs heating and cooling operations and a third private consensus network that governs computer power system operations.

9. A first trusted device positioned within a private consensus network, the first trusted device comprising:

a memory; and processing circuitry in communication with the memory, the processing circuitry being configured to:

obtain, from a private distributed ledger associated with the private consensus network, rules associated with the private consensus network, the private distributed ledger being accessible only to devices positioned within the private consensus network;

identify one or more other trusted devices positioned within the private consensus network;

receive, from an unidentified device positioned within the private consensus network, an identity verification request to identify the unidentified device within the private consensus network;

determine, based on the rules obtained from the private distributed ledger, whether to approve or deny the identity verification request;

communicate, to the one or more other trusted devices, a vote indicative of the determination of whether to approve or deny the identity verification request;

receive a corresponding vote regarding the identity verification request from each of the other trusted devices; and reclassify, based at least in part on the received votes and the vote communicated by the first trusted device, the unidentified device as an additional trusted device of the other trusted devices, wherein, to determine whether to approve or deny the identity verification request, the processing circuitry is configured to:

determine that the unidentified device satisfies device identity verification constraints specified by the rules obtained from the private distributed ledger; and approve, based on the determination that the unidentified device satisfies the device identity verification constraints specified by the rules obtained from the private distributed ledger, the identity verification request.

10. The first trusted device of claim 9, wherein the processing circuitry is further configured to:

determine that the identity verification request is approved by a quorum of a combination of the received votes and the vote communicated by the first trusted device, wherein to reclassify the processing circuitry is configured to reclassify, based on the identity verification request being approved by the quorum, the unidentified device as an additional trusted device of the other trusted devices.

11. The first trusted device of claim 9, wherein the unidentified device comprises a first unidentified device, and wherein the identity verification request comprises a first identity verification request, wherein the processing circuitry is further configured to:

receive, by the first trusted device, from a second unidentified device positioned within the private consensus network, a second identity verification request to identify the second unidentified device within the private consensus network;

determine that the second unidentified device does not satisfy device identity verification constraints of the rules obtained from the private distributed ledger; and deny, based on the determination that the second unidentified device does not satisfy the device identity verification constraints of the rules obtained from the private distributed ledger, the second identity verification request received from the second unidentified device;

communicate, to the one or more other trusted devices, a vote indicative of the denial of the second identity verification request.

12. The first trusted device of claim 11, wherein the processing circuitry is further configured to:

receive a corresponding vote regarding the second identity verification request from each of the other trusted devices; and maintain, based on the vote indicative of the denial of the second identity verification request and the received votes regarding the second identity verification request, an unidentified classification with respect to the second unidentified device.

13. The first trusted device of claim 9, wherein the processing circuitry is further configured to:

generate, in collaboration with at least one of the one or more other trusted devices, policy information; and communicate the policy information to a cloud system associated with the private consensus network.

14. The first trusted device of claim 9, wherein the first trusted device is an edge device of the private consensus network, and wherein the processing circuitry is further configured to:

obtain, from a publicly accessible consortium ledger associated with a public network, rules associated with the public network, wherein the edge device is identified with respect to the publicly accessible consortium ledger;

identify one or more other edge devices that are identified with respect to the publicly accessible consortium ledger, the other edge devices being positioned in other private consensus networks;

receive, from an unidentified device positioned outside of private consensus network, a consortium ledger identity verification request to be identified within the publicly accessible consortium ledger;

determine, based on the rules obtained from the publicly accessible consortium ledger, whether to approve or deny the consortium ledger identity verification request; and communicate, to the other edge devices that are identified to the publicly accessible consortium ledger, a vote indicative of the determination of whether to approve or deny the consortium ledger identity verification request.

15. The first trusted device of claim 14, wherein the edge device is assigned a first identifier with respect to the private consensus network and a second identifier with respect to the publicly accessible consortium ledger.

16. The first trusted device of claim 15, wherein the private consensus network is a first private consensus network that governs smart grid operations, and wherein the other edge devices that are identified with respect to the publicly accessible consortium ledger include edge devices of a second private consensus network that governs heating and cooling operations and a third private consensus network that governs computer power system operations.

17. A non-transitory computer-readable storage medium encoded with instructions that, when executed, cause one or more processors of a first trusted device to:

obtain, from a private distributed ledger associated with the private consensus network, rules associated with the private consensus network, the private distributed ledger being accessible only to devices positioned within the private consensus network;

identify one or more other trusted devices positioned within the private consensus network;

receive, from an unidentified device positioned within the private consensus network, an identity verification request to identify the unidentified device within the private consensus network;

determine, based on the rules obtained from the private distributed ledger, whether to approve or deny the identity verification request;

communicate, to the one or more other trusted devices, a vote indicative of the determination of whether to approve or deny the identity verification request receive a corresponding vote regarding the identity verification request from each of the other trusted devices; and reclassify, based at least in part on the received votes and the vote communicated by the first trusted device, the unidentified device as an additional trusted device of the other trusted devices, wherein, to determine whether to approve or deny the identity verification request, the instructions cause the one or more processors of the first trusted device to:

determine that the unidentified device satisfies device identity verification constraints specified by the rules obtained from the private distributed ledger; and approve, based on the determination that the unidentified device satisfies the device identity verification constraints specified by the rules obtained from the private distributed ledger, the identity verification request.

18. The non-transitory computer-readable storage medium of claim 17, wherein the instructions, when executed, cause the one or more processors of the first trusted device to:

determine that the identity verification request is approved by a quorum of a combination of the received votes and the vote communicated by the first trusted device, wherein to reclassify the instructions cause the one or more processors of the first trusted device to reclassify, based on the identity verification request being approved by the quorum, the unidentified device as an additional trusted device of the other trusted devices.

\* \* \* \* \*